US009532235B1

(12) United States Patent
Whelan

(10) Patent No.: US 9,532,235 B1
(45) Date of Patent: Dec. 27, 2016

(54) SPATIAL BEAMFORMING RADIO REPEATER

(71) Applicant: The Boeing Company, Chicago, IL (US)

(72) Inventor: Michael A. Whelan, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/927,801

(22) Filed: Oct. 30, 2015

(51) Int. Cl.
H04B 7/185 (2006.01)
H04W 16/28 (2009.01)

(52) U.S. Cl.
CPC ......... H04W 16/28 (2013.01); H04B 7/18513 (2013.01); H04B 7/18515 (2013.01)

(58) Field of Classification Search
CPC . H04W 16/28; H04B 7/18513; H04B 7/18515
USPC ............ 455/3.03, 12.1, 13.2, 98, 427, 404.1, 455/404.2, 456.1; 701/213; 244/158.1, 158.4, 244/158.6
See application file for complete search history.

(56) References Cited

U.S. PATENT DOCUMENTS

| | | | |
|---|---|---|---|
| 2,908,002 A | 10/1959 | Van Atta | |
| 3,757,336 A | 9/1973 | Rosen | |
| 4,813,036 A | 3/1989 | Whitehead | |
| 5,327,457 A * | 7/1994 | Leopold | H04B 1/16 375/228 |
| 5,821,658 A * | 10/1998 | Boggs, III | H01R 39/646 310/103 |
| 5,929,808 A * | 7/1999 | Hassan | H01Q 1/1257 342/359 |
| 5,966,442 A * | 10/1999 | Sachdev | H04H 20/62 370/321 |
| 6,138,681 A * | 10/2000 | Chen | A61B 5/06 128/897 |
| 6,275,479 B1 * | 8/2001 | Snell | H01Q 1/288 370/318 |
| 6,393,255 B1 | 5/2002 | Lane | |
| 7,154,439 B2 | 12/2006 | Westall | |
| 2002/0010934 A1 * | 1/2002 | Matsuda | H04H 20/74 725/64 |
| 2002/0108124 A1 * | 8/2002 | Sato | G06Q 40/04 725/136 |
| 2005/0185723 A1 * | 8/2005 | Anvari | H04L 27/2614 375/260 |
| 2006/0012521 A1 * | 1/2006 | Small | G01S 5/0215 342/386 |
| 2006/0132371 A1 * | 6/2006 | Jeon | H01Q 3/08 343/757 |
| 2006/0267703 A1 * | 11/2006 | Wang | H03L 1/026 331/176 |
| 2006/0267833 A1 * | 11/2006 | Langford | G01S 5/0252 342/174 |

(Continued)

OTHER PUBLICATIONS

Withers, M.J. "Correspondence: An Active Van Alta Array", Proceeding of the IEEE Conference; vol. 111, No. 5, May 1964, pp. 982-984.

(Continued)

Primary Examiner — Dominic Rego
(74) Attorney, Agent, or Firm — Perman & Green, LLP

(57) ABSTRACT

A spacecraft, having a satellite receiver, that is configured so that the direction of the downlink beams transmitted from the satellite receiver depends on the location of the uplink signals transmitted from the ground and not the attitude of the spacecraft in space.

20 Claims, 12 Drawing Sheets

(56) References Cited

U.S. PATENT DOCUMENTS

| | | | | |
|---|---|---|---|---|
| 2008/0291864 | A1* | 11/2008 | Chang | H04B 7/2041 370/316 |
| 2009/0093213 | A1* | 4/2009 | Miller | H04B 7/18528 455/12.1 |
| 2011/0140949 | A1* | 6/2011 | Lee | G01S 13/34 342/28 |
| 2012/0199394 | A1* | 8/2012 | Bittar | G01V 3/28 175/45 |
| 2014/0016721 | A1* | 1/2014 | Xin | H04L 1/007 375/295 |
| 2014/0065950 | A1* | 3/2014 | Mendelsohn | H04B 7/18517 455/12.1 |
| 2014/0079160 | A1* | 3/2014 | Beidas | H04L 25/067 375/341 |
| 2014/0154972 | A1* | 6/2014 | Mengwasser | H04B 7/18515 455/12.1 |
| 2014/0345114 | A1* | 11/2014 | Granger | B65B 23/00 29/559 |
| 2015/0009968 | A1* | 1/2015 | Yu | H04L 5/0053 370/336 |
| 2015/0106016 | A1* | 4/2015 | Wu | G01V 3/38 702/6 |
| 2015/0285061 | A1* | 10/2015 | Wu | E21B 47/024 340/854.1 |
| 2015/0292938 | A1* | 10/2015 | Guimond | G01J 1/0295 250/214.1 |

OTHER PUBLICATIONS

Pon, Chuck Y. "Retrodirective Array Using the Heterodyne Technique" IEEE Transactions on Antennas and Propagation, Mar. 1976, pp. 176-180.

\* cited by examiner

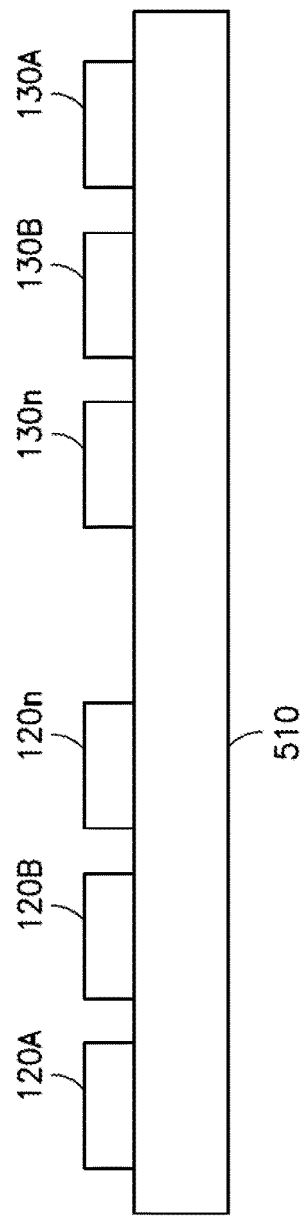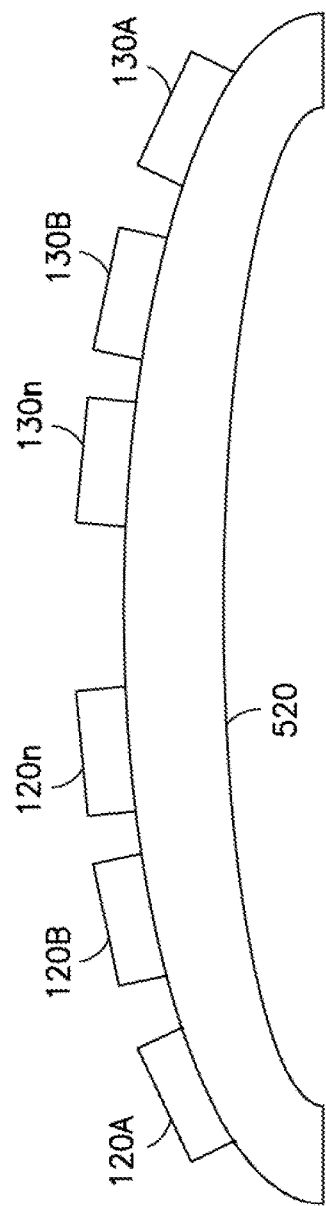

SPATIAL BEAMFORMING RADIO REPEATER

BACKGROUND

Generally, in the field of telecommunications, communication transmissions are facilitated by the use of communication platforms (e.g. relay stations). These communication platforms include any vehicle, manned or unmanned, that passes over, or hovers over a territorial coverage region, ranging from typical altitudes of manned and unmanned aircraft (UAVs) and lighter than air (LTA) platforms, to communication satellites in any orbit, not just of the Earth but of any celestial object such as the Moon or Mars.

Orbiting communication satellites facilitate communication between two or more radio terminals on the Earth. Such satellites employ antennas to focus the energy of communication signals towards specific regions of the Earth disc within the satellites' field of view or coverage area. Conventionally, communication satellites operate as simple frequency-converting radio repeaters; they receive signals from Earth station terminals uplinked in one or more bands of the radio frequency spectrum designated for satellite downlinks, and amplify the frequency-converted signals before downlinking the information to other Earth station terminals. Some communication satellites may manipulate or modify the communicated information, such as by demodulating the downlinks in a different format, but most often the signals are simply frequency converted and amplified without such manipulation.

Early communications satellites employed broad beamwidth antennas producing a single beam servicing the entire Earth disc. Some later satellites, with an aim towards providing greater aggregate communication capacity, subdivide the Earth disc into several smaller coverage beam areas, giving each beam greater focused power and enabling the uplink/downlink spectrum to be reused between the beams. However, multiple beam satellites suffer several impediments One impediment is that typical multiple beam satellites require incremental increases in satellite hardware for each additional beam they produce. This additional hardware not only increases cost of the satellite, but also constrains the number of beams the satellite is capable of sending and receiving due to the state-of-the-art mass and volume limits of the rockets which launch them into orbit. An invention which produced more beams without correspondingly increasing satellite hardware would be useful.

Another impediment is that typical communication satellites create beams whose angular directions are fixed relative to the satellites' attitude reference frame. To keep the beams pointed towards the desired positions upon the Earth disc, the spacecraft is forced to maintain increasingly more precise and accurate attitude control as the angular size of the beams become smaller. This limits the minimum size of communication beams that can be practically employed, as well as limiting the capacity performance of the beams. Thus, an invention which produced beams that could be directed towards points on the Earth independent of the satellite's attitude would be useful.

Yet another impediment of typical multiple beam satellites is that they are often, by construction, inflexible in their ability to relocate communication capacity resources between their multiple beams. For example, often, the configuration of discrete amplifiers and bandpass filters in the satellite limit the service capacity of individual beams below the total available power or bandwidth allocated to the set of beams in whole. A related impediment of typical multiple beam communication satellites is that their beams are usually stationary in relative position to each other or, if adjustable, must be adjusted by some method of side coordination and command. Even when such adjustments are made possible, they add cost and complexity to the satellite, both in construction and in operation. Thus, an invention which simply and automatically reconfigured individual beam bandwidths, powers, and angular directions would be useful.

SUMMARY

Accordingly, a system and method, intended to address the above-identified concerns, would find utility.

One example of the present disclosure relates to a spacecraft comprising a satellite receiver having receive elements, the satellite receiver being configured to receive at least one uplink communication signal including a beam amplitude and a beam frequency, a satellite amplifier configured to change the beam frequency and to amplify the beam amplitude, and a satellite transmitter having transmit elements, the satellite transmitter being configured to transmit at least one downlink communication signal wherein a direction of the at least one uplink communication signal and a direction of the at least one downlink communication signal are independent of an attitude of the spacecraft.

One example of the present disclosure relates to an spacecraft comprising a satellite frame and a retro-directive radio repeater connected to the satellite frame, the retro-directive radio repeater including a satellite receiver having receive elements, the satellite receiver configured to receive at least one uplink communication signal including a beam amplitude and a beam frequency, a satellite amplifier configured to change the beam frequency and to amplify the beam amplitude, and a satellite transmitter having transmit elements, the satellite transmitter configured to transmit at least one downlink communication signal wherein a direction of the at least one uplink communication signal and a direction of the at least one downlink communication signal are independent of an attitude of the spacecraft.

One example of the present disclosure relates a method of communication comprising receiving at least one uplink communication signal including a beam frequency and beam amplitude at a satellite receiver having receive elements, amplifying the at least one uplink communication signal with a satellite amplifier to change the beam frequency and beam amplitude to create at least one downlink communication signal, and transmitting the at least one downlink communication signal from a satellite transmitter having transmit elements wherein a direction of the at least one uplink communication signal and a direction of the at least one downlink communication signal are independent of a spacecraft attitude, where the satellite receiver and satellite transmitter are mounted to the spacecraft.

BRIEF DESCRIPTION OF THE DRAWINGS

Figure 1:
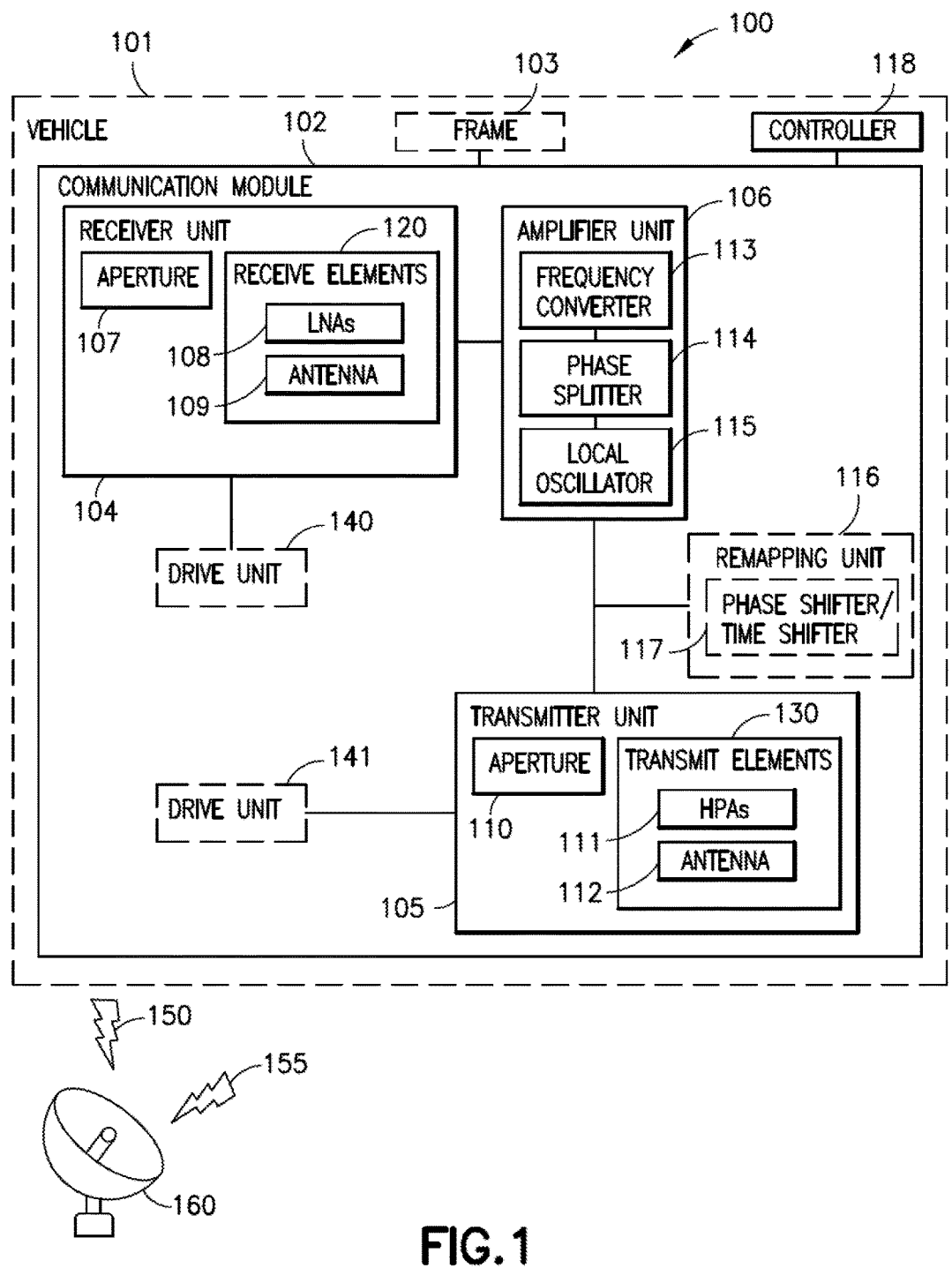
Figure 2:
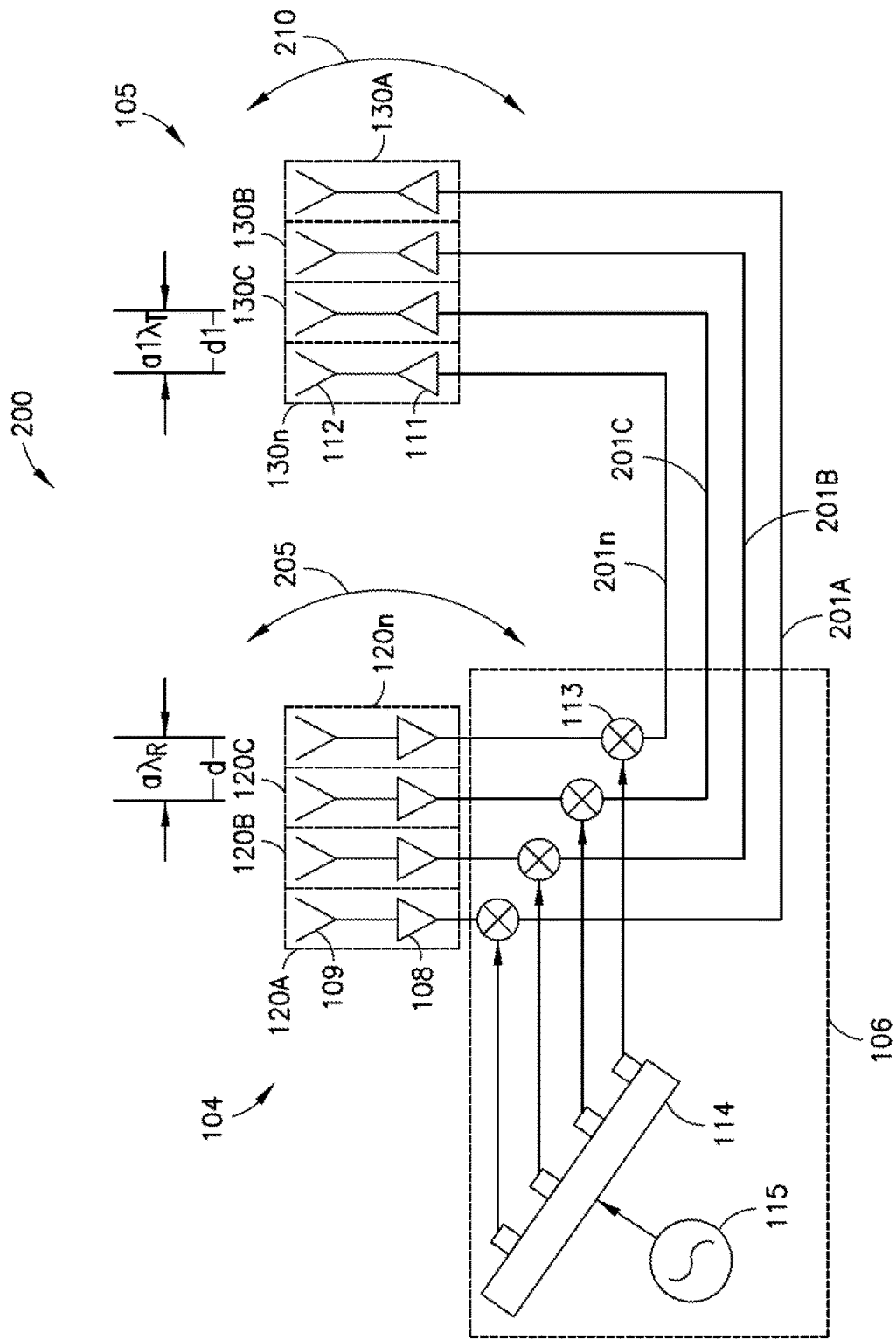
Figure 3:
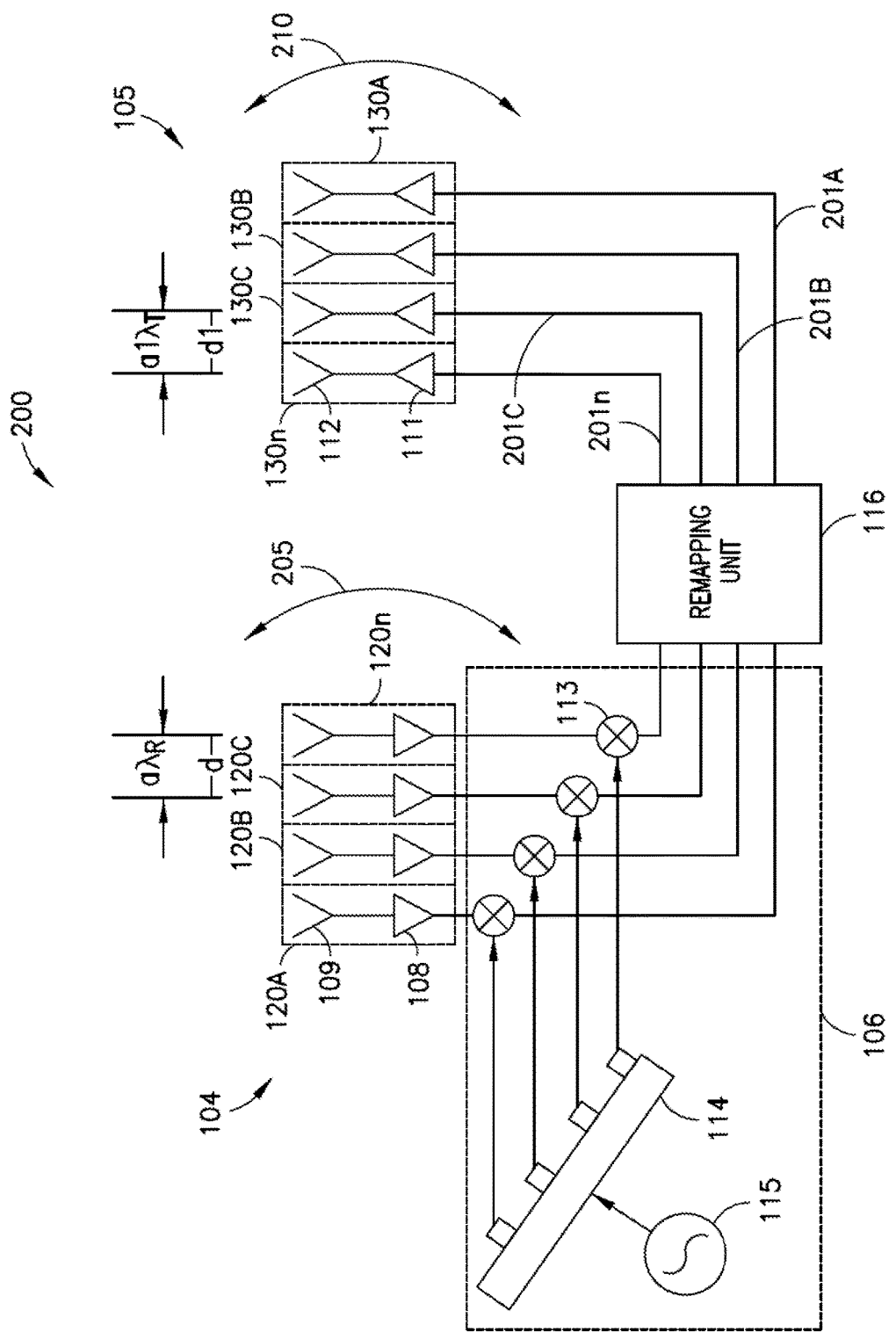
Figure 4:
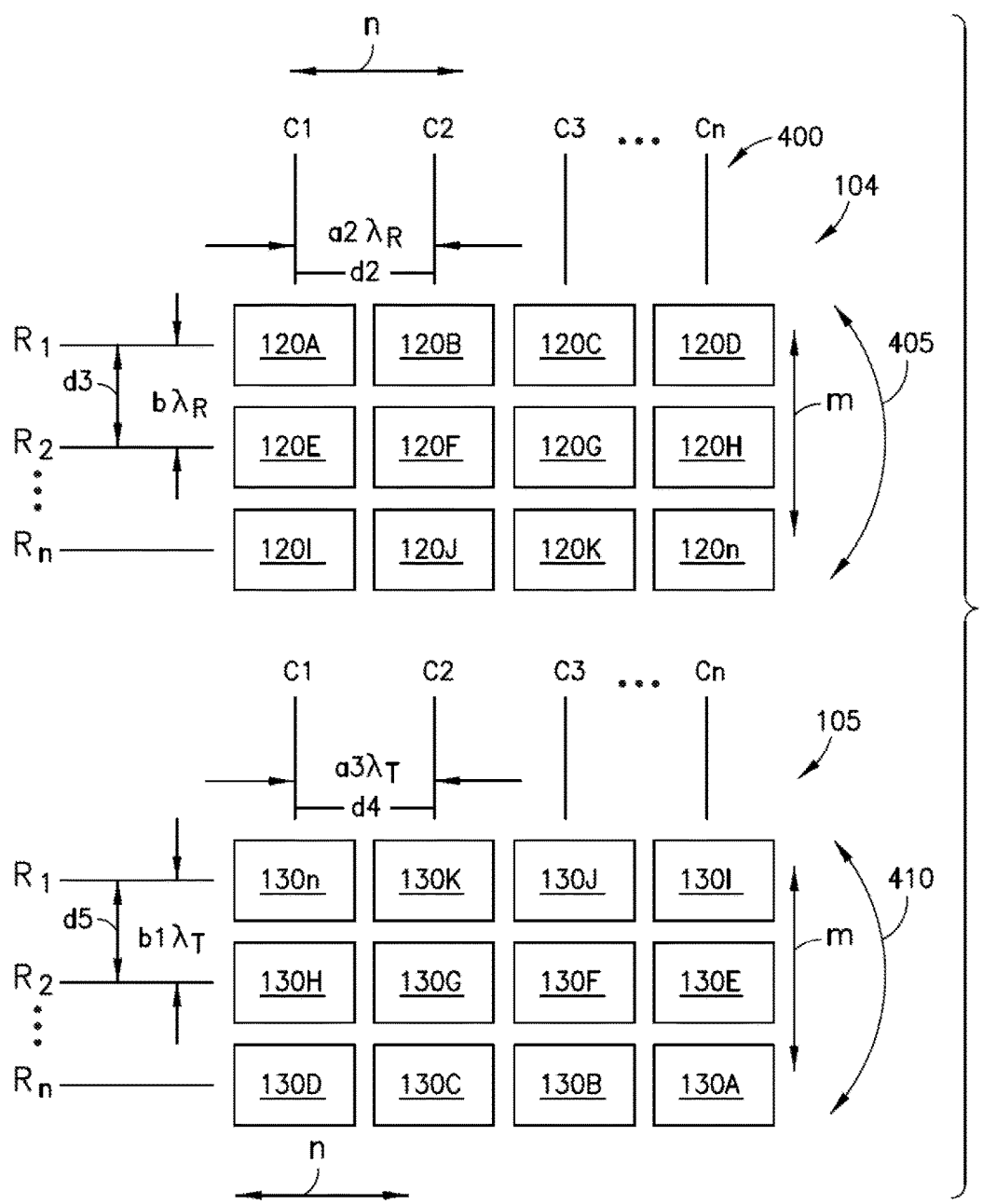
Figure 6:
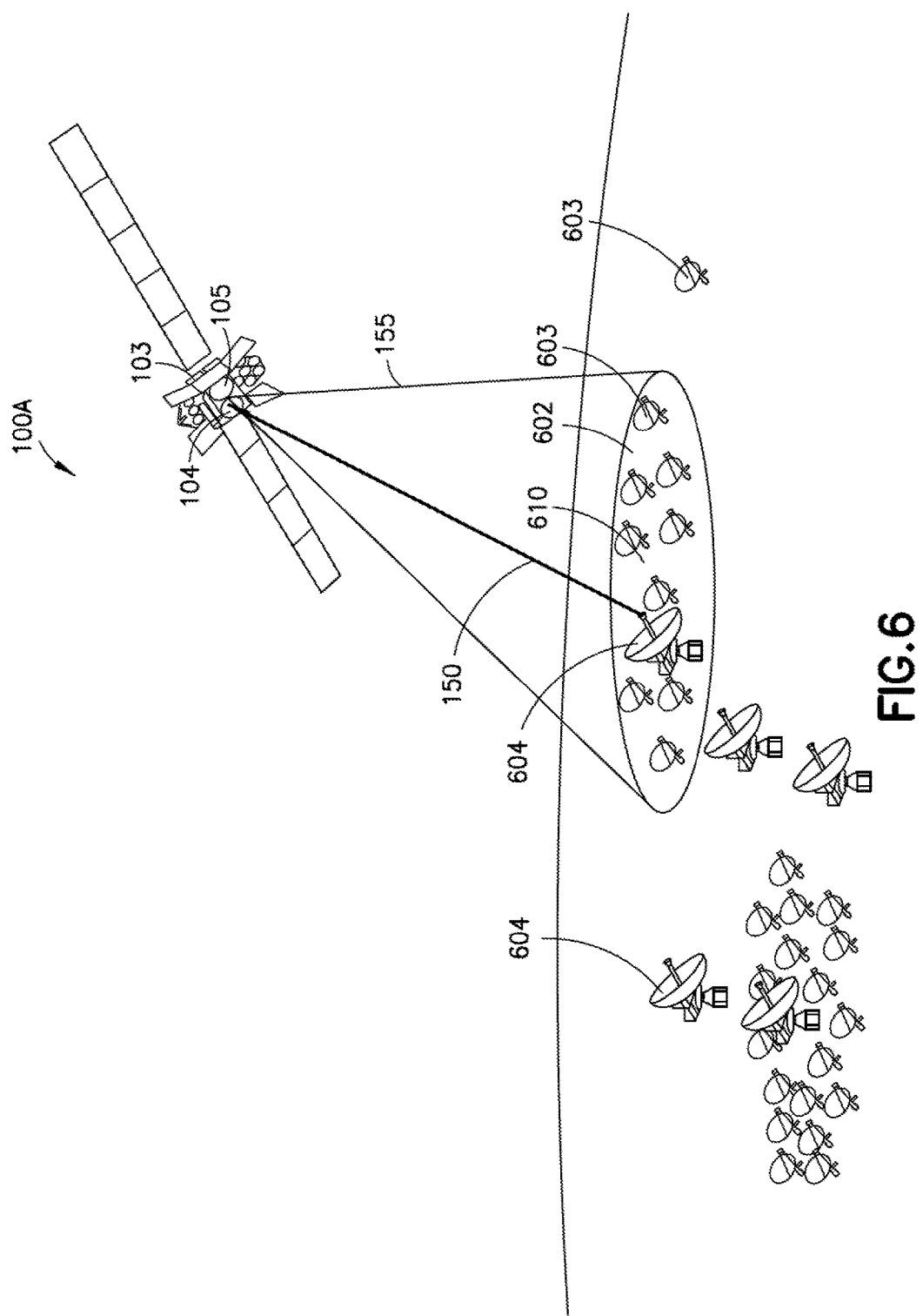
Figure 7:
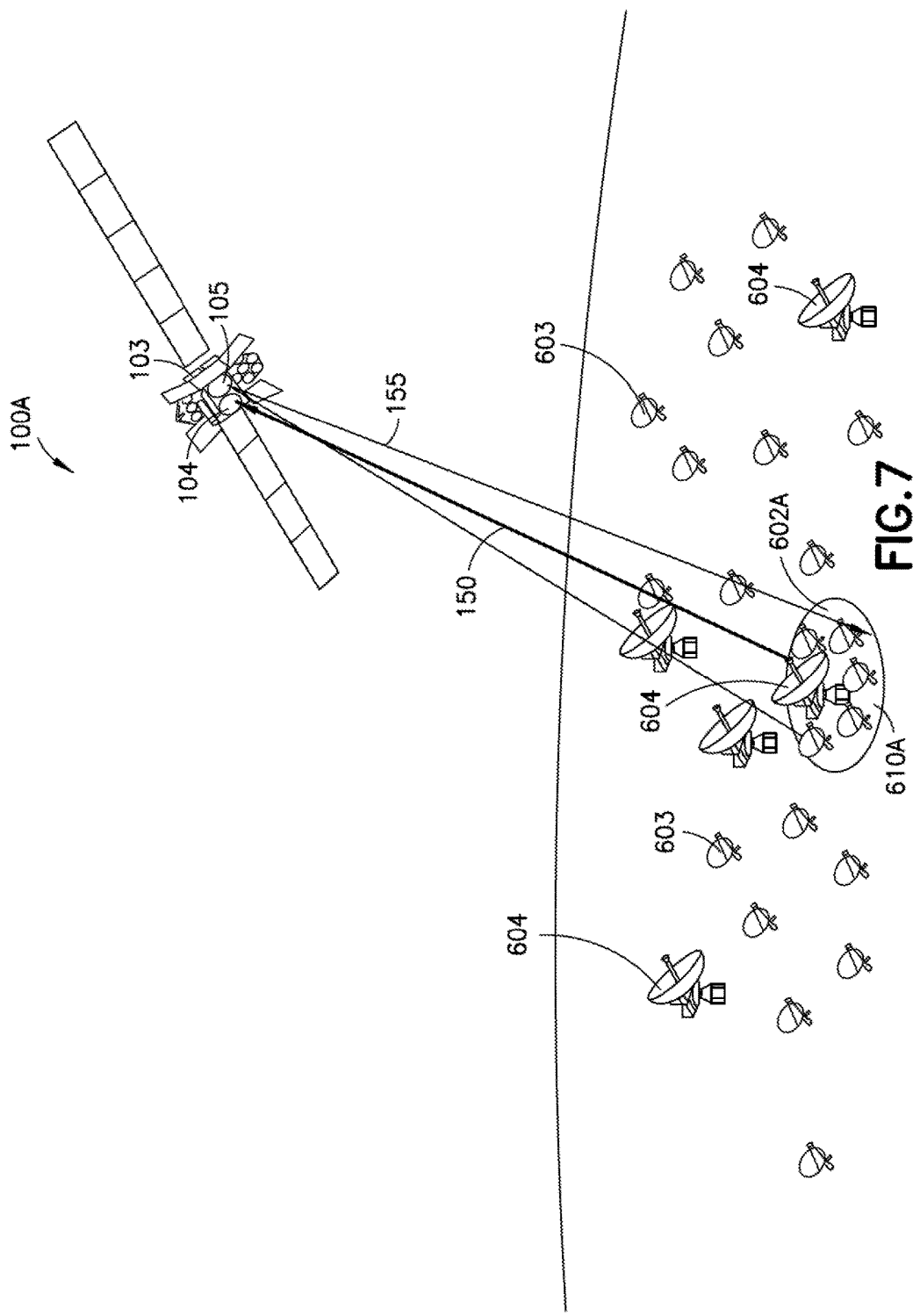
Figure 8:
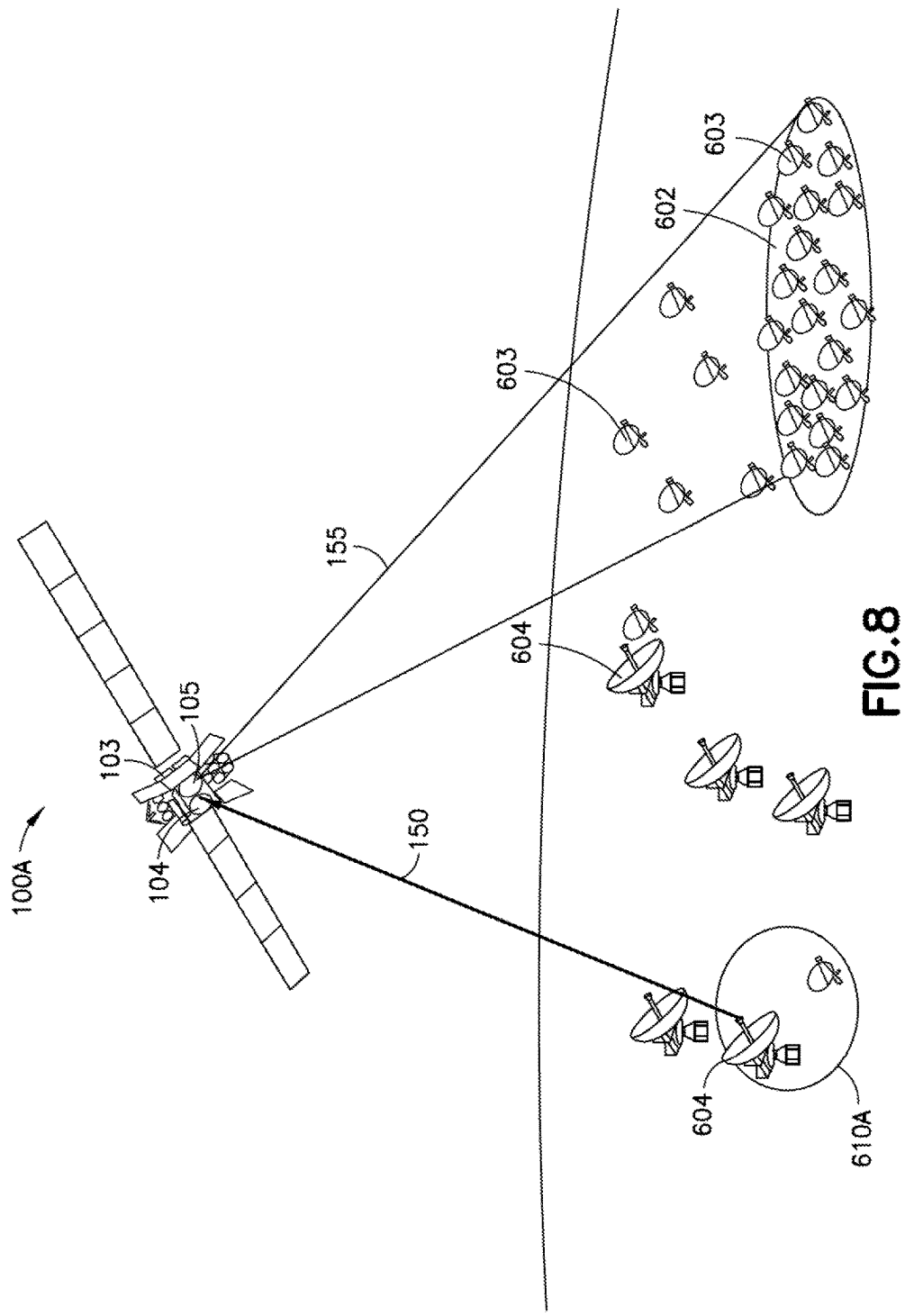
Figure 9:
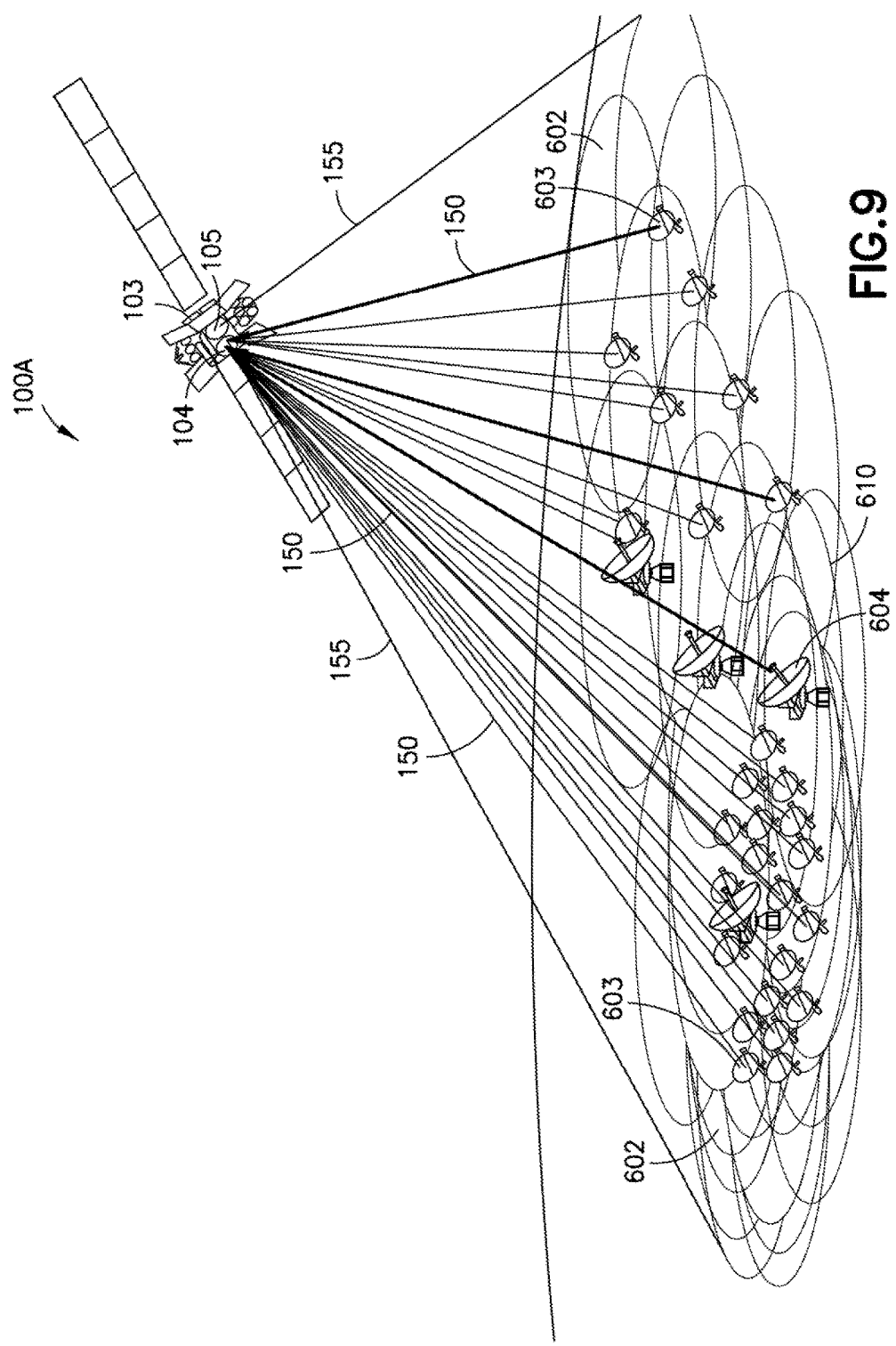
Figure 10:
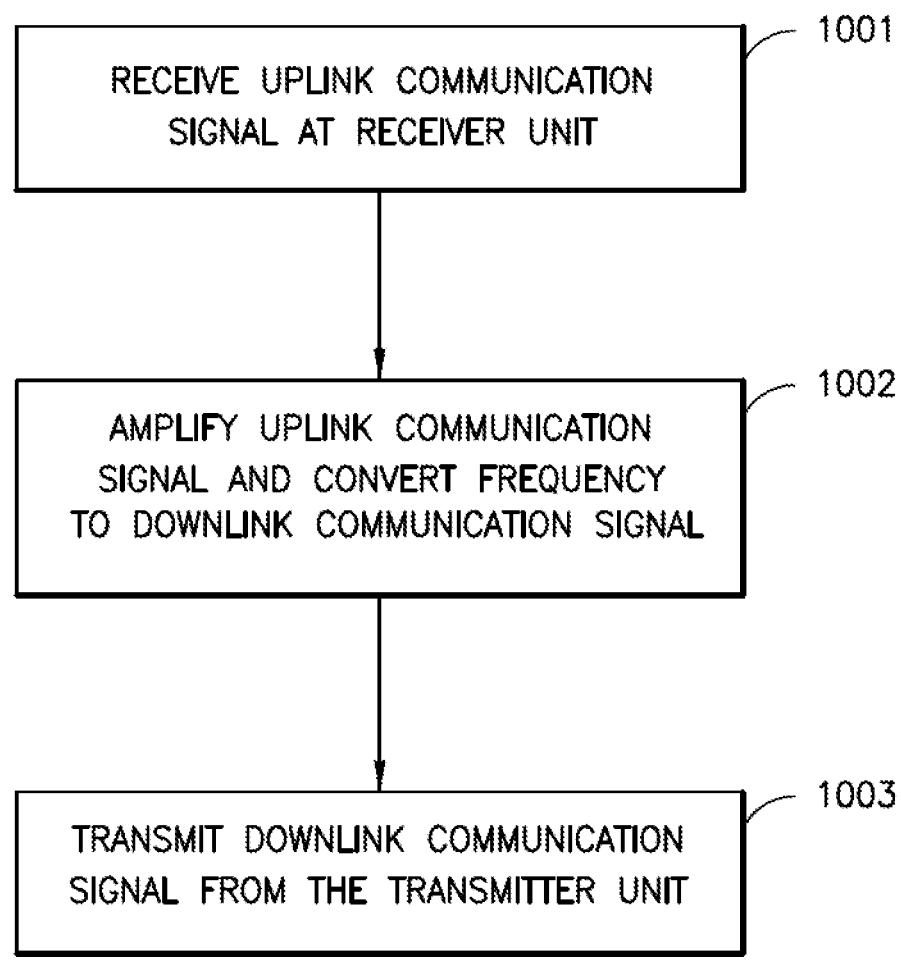
Figure 11:
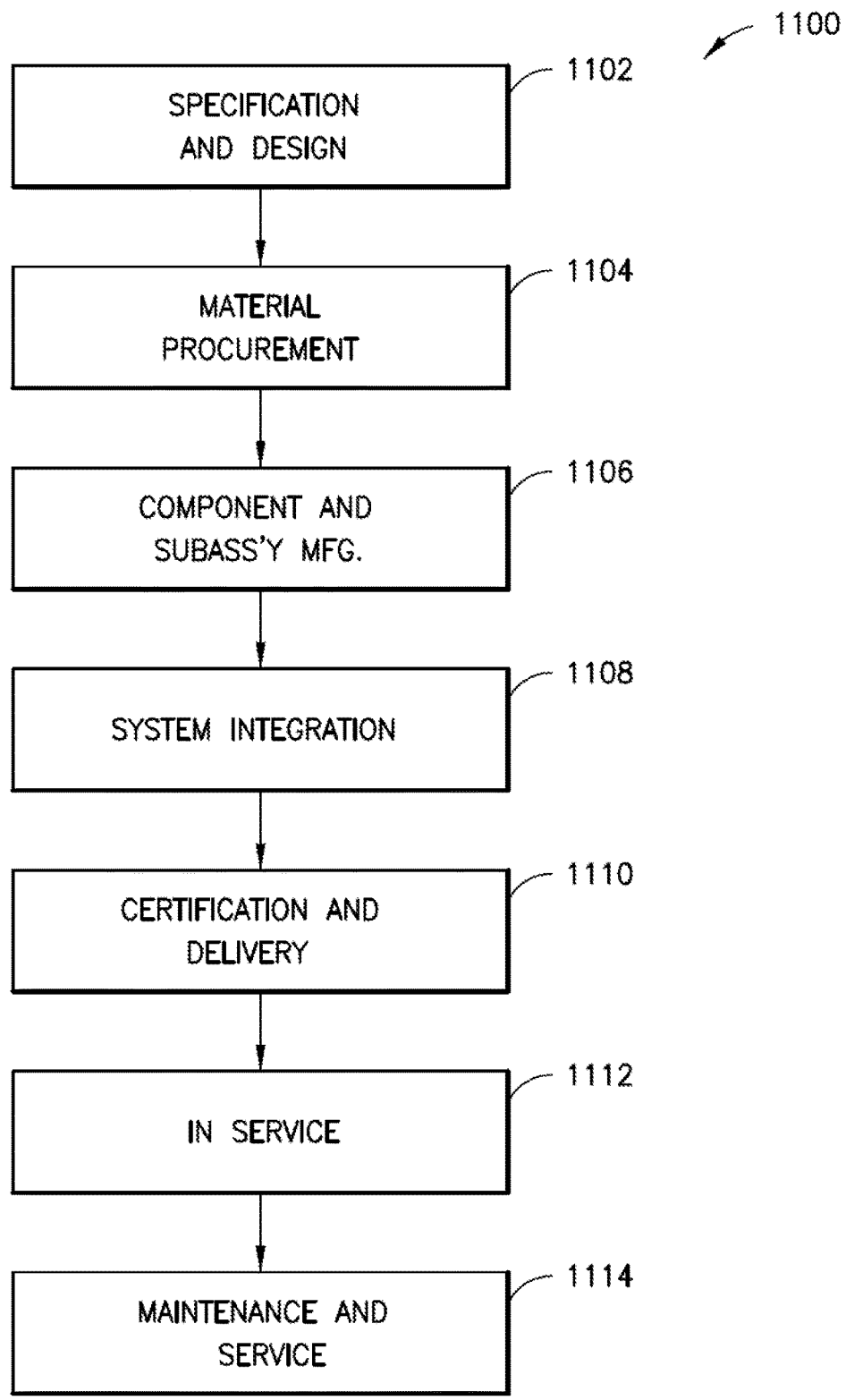
Figure 12:
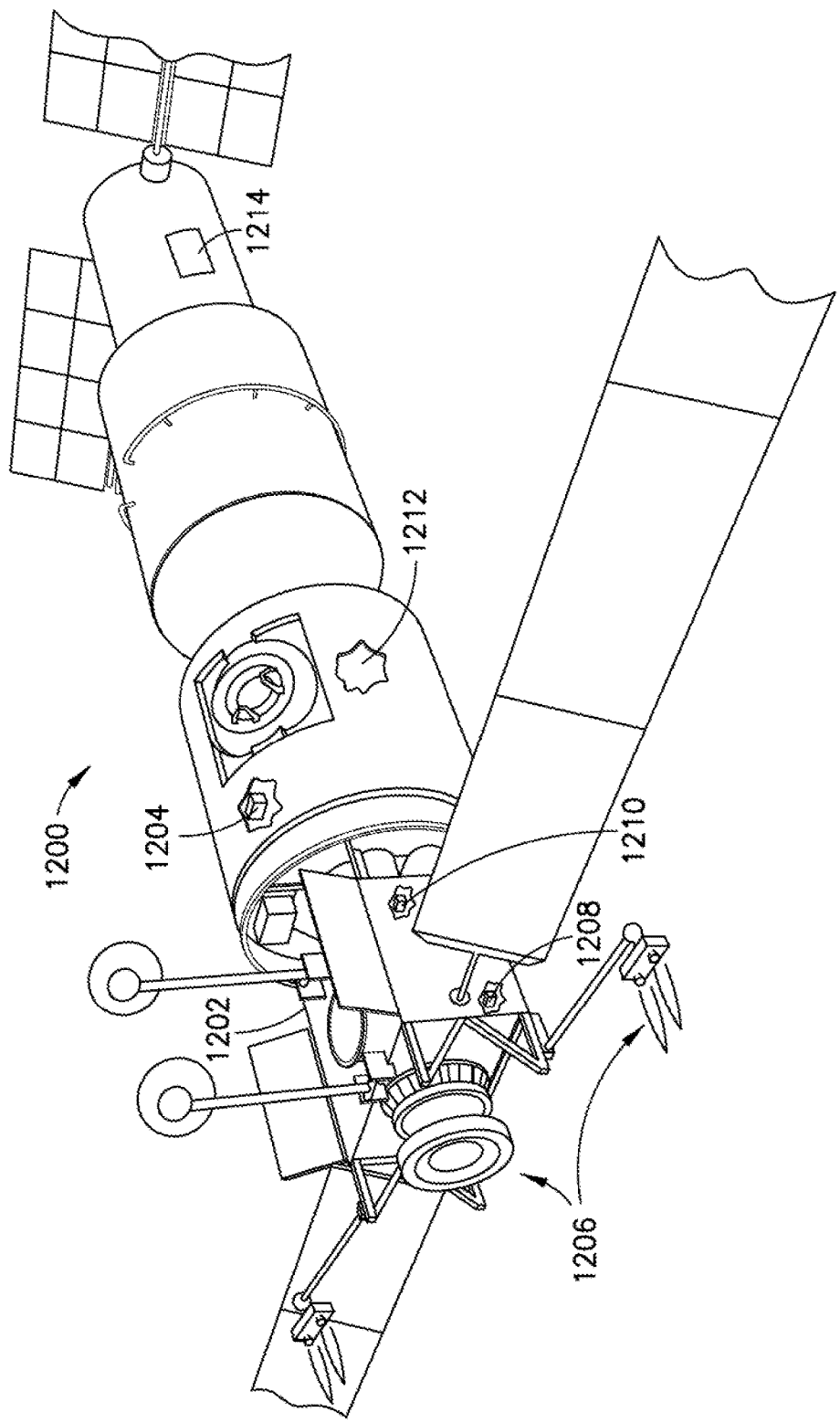

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of a communications platform according to one or more aspects of the present disclosure;

FIG. 2 is a schematic illustration of a portion of the communications platform according to one or more aspects of the present disclosure;

FIG. 3 is a schematic illustration of a portion of the communications platform according to one or more aspects of the present disclosure;

FIG. 4 is a schematic illustration of a portion of the communications platform according to one or more aspects of the present disclosure;

FIGS. 5a and 5b are schematic illustrations of portions of the communication platform according to one or more aspects of the present disclosure;

FIG. 6 is a schematic illustration of an operation of the communication platform according to one or more aspects of the present disclosure;

FIG. 7 is a schematic illustration of an operation of the communication platform according to one or more aspects of the present disclosure;

FIG. 8 is a schematic illustration of an operation of the communication platform according to one or more aspects of the present disclosure;

FIG. 9 is a schematic illustration of an operation of the communication platform according to one or more aspects of the present disclosure;

FIG. 10 is a flow diagram of an operation of the communication platform according to one or more aspects of the present disclosure;

FIG. 11 is a flow diagram of spacecraft production and service methodology according to one aspect of the present disclosure; and FIG. 12 is a schematic illustration of the communication platform including distributed vehicle systems according to one aspect of the present disclosure.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Referring now to FIG. 1, the aspects of the present disclosure described herein provide for a communication platform 100 of relatively simple construction that is configured to produce large numbers (e.g. virtually unlimited) of communication beams substantially without beam forming hardware. The communication beams are insensitive to communication platform attitude pointing error due to, for example, the mirror like manner in which the communication platform 100 bounces back the downlink communication beams received from, for example, Earth, where the "attitude" of the communication platform is defined as the position or orientation of the communication platform, either in motion or at rest, as determined by the relationship between the axes of the communication platform and some reference line or plane (such as the surface of the Earth). Thus, the communication beams can be made small and numerous. Generally, in the aspects of the present disclosure, the communication platform 100 includes a retrodirective radio repeater having a receive aperture 107 and an associated transmit aperture 110 as described in greater detail herein. Radio waves in a receiver frequency band impinging on the receive aperture 107 are captured, frequency-translated to a transmit frequency band, amplified, and transmitted by the transmit aperture 110, such that the transmitted signal propagates in the direction of the received signal. As will be described below, the transmit signal, in one or more aspects, is transmitted in a different direction from which the receive signal was received through manipulation of the transmit aperture 110 relative to the receive aperture 107. In other aspects, the coverage area of the transmit signal is modified through manipulation of the transmit aperture 110 relative to the receive aperture 107. Further, the aspects of the present disclosure provide more communication beams with less hardware than conventional communication systems. In one aspect, a communication platform or system 100 comprises a vehicle 101, such as a spacecraft. In one aspect the spacecraft is a satellite. While, in one aspect of the present disclosure, the communication system 100 is described as part of a satellite architecture, it is understood that, in other aspects, the communication system 100 can be part of any aerial or orbital communication platform, for example, a long-term unmanned aerial vehicle or a lighter-than-air dirigible vehicle. In one aspect, the vehicle 101 includes a frame 103 and a communication module 102. In one aspect of the present disclosure, the communication module 102 includes a receiver unit 104, a transmitter unit 105, and an amplifier unit 106 communicably coupled together. The communication module 102 may also include one or more controllers 118 connected to one or more of the receiver unit 104, the transmitter unit 105 and/or the amplifier unit 106. In other aspects of the present disclosure, the communication module 102 may include a remapping unit 116 configured to remap connections between the receiver unit 104 and the transmitter unit 105 as will be described further herein. In one aspect of the present disclosure, the receiver unit 104 includes a receive aperture 107 and one or more receive elements 120. In one aspect, the receive aperture 107 and receive elements 120 are a single unitary member. The receive aperture 107 and receive elements 120 are configured to capture one or more incoming or uplink communication signals 150, such as a user beam or a gateway beam, which includes a beam frequency and beam amplitude. In one aspect of the present disclosure, the receive elements 120 are positioned relative to the receive aperture 107 so as to receive the uplink communication signal 150 passing through the receive aperture 107. The receive elements 120, in one aspect, include one or more low noise amplifiers 108 and one or more receive antennas 109. The one or more low noise amplifiers 108 are configured to amplify the uplink communication signals 150 for transmission to the amplifier unit 106. In one aspect, each of the receive elements 120 includes a respective low noise amplifier 108 and receive antenna 109.

In one aspect of the present disclosure, referring to FIGS. 1 and 2, the amplifier unit 106 is communicably coupled to the receiver unit 104 and includes one or more frequency converters 113, a phase splitter 114, and a local oscillator 115. As can be seen in FIG. 2, each receive element 120A-120n is connected to a respective transmit element 130A-130n by a respective transmission line 201A-201n. In one aspect, a frequency converter 113 is communicably coupled to each transmission line 201A-201n where the phase splitter 114 splits the local oscillator signal from the local oscillator 115 between the frequency converters 113. The one or more frequency converters 113 are configured to receive and convert a frequency of the uplink communication signal 150 to a downlink communication signal 155 frequency. The frequency converters 113 are coupled to and receive a local oscillator signal from the local oscillator 115 to effect conversion of the uplink communication signal 150 to the downlink communication signal 155. In one aspect, the one or more frequency converters 113 down convert the uplink communication signals 150 while in other aspects the uplink communication signals 150 may be upconverted.

In one aspect of the present disclosure, the transmitter unit 105 is connected to the receive unit 104 through the amplifier unit 106 and includes a transmit aperture 110 and one or more transmit elements 130. In one aspect, the transmit aperture 110 and the transmit elements 130 are a single unitary member. The transmit aperture 110 is configured for the transmission of one or more outgoing or downlink communication signals 155 such as with the transmit elements 130. In one aspect of the present disclosure, the transmit elements 130 are positioned relative to the transmit aperture 110 so as to transmit the downlink communication signal(s) 155 where the downlink communication signal(s) 155 pass through the transmit aperture 110. In one aspect, each transmit element 130 includes one or more high power amplifiers 111 and one or more transmit antennas 112. The transmit antennas 112 are configured to transmit the downlink communication signal(s) 155 through the transmit aperture 110 and toward, for example, a ground station 160 or terrestrial or extraterrestrial receiving unit. The one or more high power amplifiers 111 are configured to amplify a respective downlink communication signal 155 for the transmission of the downlink communication signal(s) 155.

In one aspect of the present disclosure, controller 118 is provided to control aspects of the communication platform 100. The controller 118 can control the operations of the receiver unit 104, such as how the uplink communication signal 150 is received by the receiver unit 104. In other aspects, the controller 118 may control how the uplink communication signal 150 is converted and amplified by the amplifier unit 106 and further how the downlink communication signal 155 is transmitted by the transmitter unit 105.

Referring now to FIGS. 2-3, an exemplary side view diagram of a communication element array 200 is shown. In this aspect, the array 200 is a linear array where the receive elements 120A-120n are arranged in a single row or column and the transmit elements 130A-130n are arranged in a single row or column. In one aspect, the single row or column of receive elements 120A-120n may be offset from the single row or column of transmit elements 130A-130n. In other aspects, the single row or column of receive elements 120A-120n may be in line with the single row or column of transmit elements 130A-130n. In one aspect of the present disclosure, the array 200 includes one or more receive elements 120A-120n. In one aspect of the present disclosure, the receive elements 120A-120n are positioned linearly and placed a distance d apart from one another. The distance d is a predetermined value which is a multiple of a wavelength of the frequency $\lambda_R$ of the uplink communication signal 150. For example, the distance d is the frequency $\lambda_R$ wavelength multiplied by a predetermined factor $\alpha$ such as a non-zero positive fractional number or integer. In one aspect of the present disclosure, each receive antenna 109 is coupled to a respective low noise amplifier 108.

In one aspect of the present disclosure, the array 200 includes one or more transmit elements 130A-130n. The transmit elements 130A-130n are placed a distance d1 apart. The distance d1 is a predetermined value which is a multiple of a wavelength of the frequency $\lambda_T$ of the downlink communication signal 155. For example, the distance d1 is the frequency $\lambda_T$ wavelength multiplied by a predetermined factor $\alpha1$ such as a non-zero positive fractional number or integer. In one aspect of the present disclosure, the distance d1 is substantially similar to the distance d of the receive elements 120A-120n, while in other aspects, the distance d1 is different than that of distance d. In one aspect of the present disclosure, each of the transmit elements 130A-130n include a transmit antenna 112 and a high power amplifier 111. The transmit antenna 112 is coupled to the high power amplifier 111, where the downlink communication signal 155 is received at the high power amplifier 111, from the amplifier unit 106 (and/or remapping unit 116), amplified and sent to the transmit antenna 112. The transmit antenna 112 transmits the downlink communication signal 155 in a destination direction. In one aspect, the transmit elements 130A-130n are positioned relative to the receive elements 120A-120n so that the downlink communication signal 155 is transmitted in a substantially similar direction from which the uplink communication signal 150 was received (see FIGS. 6 and 7). For example, in one aspect, the transmit elements 130A-130n are rotated about 180 degrees relative to the receive elements 120A-120n, as illustrated in FIGS. 2 and 3 to effect transmitting the downlink communication signal 155 in substantially the same direction in which the uplink communication signal 150 was received. In the linear array illustrated in FIGS. 2 and 3, receive elements 120A-120n are respectively connected to transmit elements 130A-130n (e.g. receive element 120A is connected to transmit element 130A, receive element 120B is connected to transmit element 130B, etc.) however, the position of the transmit elements 130A-130n in the linear array are reversed (e.g. rotated about 180 degrees) relative to the receive elements 120A-120n. For example, the order of the receive elements 120A-120n in the linear array is 120A, 120B, 120C, . . . , 120$n$ while the order of the transmit elements 130A-130$n$ in the linear array is 130$n$, . . . , 130C, 130B, 130A. In other aspects, as described herein, at least the transmit elements 130A-130$n$ may be moved (either physically or through the remapping unit 116) relative to the receive elements 120A-120$n$ to change the destination direction.

In one aspect of the present disclosure, an uplink communication signal 150 is received at the receive antenna 109 and transmitted to amplifier unit 106. The amplifier unit 106 which includes the frequency converter 113, phase splitter 114 and local oscillator 115 converts the frequency $\lambda_R$ of the uplink communication signal 150 to the frequency $\lambda_T$ of the downlink communication signal 155. In one aspect of the present disclosure, the downlink communication signal 155 is transmitted from a receive element 120A-120$n$ by, for example, the transmission lines 201A-201$n$ to a respective transmit element 130A-130$n$. The receive elements 120A-120$n$ are mapped to the respective transmit element 130A-130$n$ with a respective transmission line 201A-201$n$. In one aspect, each transmission line 201A-201$n$ has a length that is substantially equal to the other transmission lines 201A-201$n$ (i.e. the transmission lines 201A-201$n$ have a common length). The common length of the transmission lines 201A-201$n$ provides signal travel distances between the receive elements 120A-120$n$ and the transmit elements 130A-130$n$ that are substantially equal. In one aspect, the receive elements 120A-120$n$ connected to the transmit elements 130A-130$n$ by at least the common length transmission lines effect the transmission of the uplink communication signal 150 and downlink communication signal 155 in a common direction that is insensitive to a spatial attitude of the communication platform 100. As described herein, the common length of the transmission lines 201A-201$n$ can be effected physically by a length of each line or electronically such as by switches, delays, channelizers, etc. As such, in one or more aspects of the present disclosure, the mirror like receive and transmit capabilities of the communication platform 100 cause the downlink communication signals 155 to point towards their uplink communication signals 150 making the uplink and downlink signals insensitive to communication platform attitude.

Referring to FIG. 3, in one aspect of the present disclosure, the remapping unit 116 is communicably coupled to the transmission lines 201A-201$n$ to effect remapping the connections between the receive elements 120A-120$n$ and the transmit elements 130A-130$n$. For example, in one aspect, the transmission lines 201A-201$n$ are selectively remapped such that one or more receive elements 120A-120$n$ are mapped to one or more different transmit element 130A-130$n$ (i.e. receive element 120A is remapped from transmit element 130A to transmit element 130B etc.). In one aspect of the present disclosure, the remapping of the transmission lines 201A-201$n$ is a static remapping or a dynamic remapping. One example of static remapping is factory rewiring, while examples of dynamic remapping include a switch matrix, or a channelizer, where the switch matrix and channelizer are under control of the controller 118 to selectively remap the receive to transmit connection(s). In one aspect, the switch matrix or channelizer includes phase/time shifter(s) 117 to dynamically map or remap the receive elements 120A-120$n$ to the transmit elements 130A-130$n$. Remapping of the receive elements 120A-120$n$ to the transmit elements 130A-130$n$, in one aspect, can broaden the beam of the downlink communication signal 155 and in other aspects, can change the direction in which the downlink communication signal 155 will transmit. In one aspect, the remapping unit 116 may be included or part of the amplifier unit 106. In one aspect, referring to FIG. 4, a communication element array 400 is illustrated in plan view as having a planar configuration (e.g. the receive elements 120A-120$n$ and transmit elements 130A-130$n$ are arranged in both columns and rows). In one aspect of the present disclosure, the receive elements 120A-120$n$ are disposed in an n by m array having columns C1-Cn in the n direction and rows R1-Rn in the m direction. In the n direction, the receive elements 120A-120$n$ are position a distance d2 apart. The distance d2 is a predetermined value which is a multiple of a wavelength of the frequency $\lambda_R$ of the uplink communication signal 150. For example, the distance d2 is the frequency $\lambda_R$ wavelength multiplied by a predetermined factor $\alpha 2$ such as a non-zero positive fractional number or integer. In the m direction, the receive elements 120A-120$n$ are positioned a distance d3 apart. The distance d3, similar to d2, is the frequency $\lambda_R$ multiplied by a predetermined factor b. In one aspect, the distance d2 is equal to or different than d3.

In one aspect of the present disclosure, the transmit elements 130A-130$n$ are disposed in an n by m array. In the n direction, the transmit elements 130A-130$n$ are position a distance d4 apart. The distance d4 is a predetermined value which is a multiple of a wavelength of the frequency $\lambda_T$ of the downlink communication signal 155. For example, the distance d4 is the frequency $\lambda_T$ wavelength multiplied by a predetermined factor $\alpha 3$ such as a non-zero positive fractional number or integer. In the m direction, the transmit elements 130A-130$n$ are positioned a distance d5 apart. The distance d5, similar to d4, is the frequency $\lambda_T$ multiplied by a predetermined factor b1. The distance d4 is equal to or different than d5. Further, the distance d4 is, in one aspect, substantially the same as distance d2 while in other aspects d4 and d2 are different. In one aspect, the distance d5 is substantially the same as distance d3 while in other aspects d5 and d3 are different. The receive elements 120A-120$n$ and transmit elements 130A-130$n$ are connected to each other in the manner described herein with respect to the linear array 200 and FIGS. 1-3.

Similar to the linear array 200, the transmit elements 130A-130$n$ of the planar array 400 are, in one aspect, positioned relative to the receive elements 120A-120$n$ to transmit the downlink communication signal(s) 155 in a direction that is substantially the same direction from which the uplink communication signal(s) 150 was received (see FIGS. 6 and 7). In one aspect, a rotation of about 180 degrees of the transmit elements 130A-130$n$, relative to the receive elements 120A-120$n$, will effect return of the downlink communication signal 155 in a substantially similar direction from which the uplink communication signal(s) 150 was received. For example, in the planar array illustrated in FIG. 4, receive elements 120A-120$n$ are respectively connected to transmit elements 130A-130$n$ (e.g. receive element 120A is connected to transmit element 130A, receive element 120B is connected to transmit element 130B, etc.) however, the position of the transmit elements 130A-130$n$ in the planar array are reversed (e.g. rotated about 180 degrees) relative to the receive elements 120A-120$n$. For example, in the planar array receive elements 120A-120$n$ are arranged in the following order: element 120A is positioned at column C1, row R1; element 120B is positioned at column C2, row R1; . . . ; element 120$n$ is positioned at column Cn, row Rn. The transmit elements 130A-130$n$ in the planar array are arranged in the following order: transmit element 130$n$ is positioned at column C1, row R1; . . . ; transmit element 130B is positioned at column C3, row Rn; and transmit element 130A is positioned at column Cn, row Rn. In other aspects, as described herein, at least the transmit elements 130A-130n may be moved (either physically or through the remapping unit 116) relative to the receive elements 120A-120n to change the destination direction.

Referring now to FIGS. 5a and 5b, the linear array 200 and the planar array 400 may be disposed on a surface having any suitable contour. For example, in one aspect of the present disclosure, the receive elements 120A-120n and the transmit elements 130A-130n of array 200, 400 are illustrated in FIG. 5a as being disposed on a substantially flat surface 510 of the communication platform 100. In other aspects, the receive elements 120A-120n and the transmit elements 130A-130n of the array 200, 400 are disposed on a curved surface 520 of the communication platform 100 as illustrated in FIG. 5b. In still other aspects, the receive elements 120A-120n and the transmit elements 130A-130n can be disposed on any contoured surface of the communication platform 100.

Referring now to FIG. 6, an example operation of the communication platform 100, illustrated here as satellite 100A, is shown. The satellite 100A is shown, for example, positioned above a terrestrial planet such as Earth. In one aspect of the present disclosure, a gateway terminal/station 604, which for example is a ground station or earth station, transmits an uplink communication signal 150 to the satellite 100A. The satellite 100A receives the uplink communication signal 150 at the receiver unit 104 (FIG. 10, Block 1001). The uplink communication signal 150 is transferred from the receiver unit 104 to an amplifier unit 106 where it is converted to a downlink communication signal 155 and amplified (FIG. 10, Block 1002). The downlink communication signal 155 is then transferred to the transmitter unit 105 where it is transmitted from the satellite 100A to another location, for example, user terminal/station 603 (FIG. 10, Block 1003). In one aspect, transmitter unit 105 is positioned relative to the receiver unit 104 as described above (e.g. rotated about 180 degrees relative to receiver unit 104), such that the uplink communication signal 150 is received and the downlink communication signal 155 is transmitted in the same direction. In other aspects (as seen in FIG. 8), the transmitter unit 105 transmits the downlink communication signal 155 in a direction different than that of the uplink communication signal 150 as described herein.

Referring to FIGS. 6 and 7, when the downlink communication signal 155 is transmitted, the beam is generally transmitted in a downlink coverage area 602 and when the uplink communication signal 150 is receiver, the beam is generally received from an uplink coverage area 610 (which in FIGS. 6 and 7 are illustrated as being the same size). In one aspect of the present disclosure, the coverage area 602, 610 can be broad and provide coverage for multiple user terminal/stations 603 or a vast area. In other aspects, the coverage area 602A, 610A can be narrow (as seen in FIG. 7) and cover a limited number of user terminal/stations 603 or a small area. In one aspect, the communication platform 100, again illustrated as satellite 100A, is configured to effect narrowing and/or broadening of one or more of the downlink coverage area 602 and the uplink coverage area 610. FIG. 7 illustrates the coverage areas 602A, 610A in a narrowed or zoomed in form.

In one aspect of the present disclosure, referring to FIGS. 1-3 and 6-7, the communication platform 100 includes one or more drive units 140, 141 connected to one or more of the receiver unit 104 and transmitter unit 105. For example, drive unit 140 is connected to the receiver unit 104 to effect one or more of tilting the receiver unit 104 and/or rotating the receiver unit 104 while drive unit 141 is connected to the transmitter unit 105 to effect one or more of tilting the transmitter unit 105 and/or rotating the transmitter unit 105. In one aspect, the drive unit 140, 141 may be a common drive unit connected to both the receiver unit 104 and the transmitter unit 105. The drive unit(s) 140, 141 are connected to the controller 118 and are configured to receive commands from the controller for moving a respective one of the receiver unit 104 and transmitter unit 105 as described herein. In one aspect, the receiver unit 104 can be tilted in a direction 205 a predetermined amount relative to the transmitter unit 105, and/or the transmitter unit 105 can be tilted in direction 210 a predetermined amount relative to the receiver unit 104 (see FIG. 2). The tilting of either or both of the receiver unit 104 and the transmitter unit 105 effects focusing (e.g. zooming in) the receive coverage area 610A and/or the transmit coverage area 602 to a predetermined area of coverage and can effect broadening the transmit coverage area 602A and/or the receive coverage area 610 (e.g. zooming out) to a predetermined area of coverage (i.e. the difference in a zoomed in and zoomed out coverage area is illustrated in FIG. 6 and FIG. 7 where FIG. 6 shows a broad zoomed out coverage area 602, 610 and FIG. 7 shows a narrow zoomed in coverage area 602A, 610A).

In other aspects, the tilting of one or more of the receiver unit 104 and transmitter unit 105 is effected electronically, e.g. without physical movement of the receiver unit 104 and transmitter unit 105. For example, the length of the transmission lines 201A-201n can be lengthened of shortened, such as with switches and jumpers included in, for example, the remapping unit 116 or any other unit communicably coupled to the transmission lines 201A-201n and under control of controller 118. The lengthening or shortening of the transmission lines 201A-201n provides an electrical equivalent of a physical tilting of one or more of the receiver unit 104 and transmitter unit 105.

Referring to FIG. 1, in one aspect of the present disclosure, the communication platform 100, such as satellite 100A, is configured to broaden or narrow a beam of the uplink communication signal 150 and/or a beam of the downlink communication signal 155. For example, one or more of the receive elements 120A-120n and/or one or more of the transmit elements 130A-130n are, in one aspect, selectively turned on or off. For example, the fewer the number of active receive elements 120A-120n, the broader the uplink communication signal beam(s) (e.g. receive elements 120A, 120B are turned on or are active while receive elements 120C-120n are off or are inactive). Similarly, the fewer the number of active transmit elements 130A-130n, the broader the downlink communication signal beam(s) (e.g. transmit elements 130A, 130B are turned on or are active while transmit elements 130C-130n are off or are inactive). Conversely the greater the number of active receive elements 120A-120n or transmit elements 130A-130n, the narrower the respective uplink and downlink communication beam(s). The controller 118 is, in one aspect, configured to effect turning on and off the receive elements 120A-120n and the transmit elements 130A-130n such as through the remapping unit 116 or any suitable switches communicably coupled to the transmission lines 201A-201n.

Referring now to FIGS. 1 and 8, in one aspect, the communication platform 100, such as satellite 100A, is configured to change the direction of the downlink communication signal area and/or beam(s) relative to the direction of the uplink communication signal area and/or beam(s). As described herein, the communication platform 100, in one aspect, includes drive units 140, 141 connected to the respective receiver unit 104 and transmitter unit 105 to effect rotation of one or more of the receiver unit 104 and transmitter unit 105 in the directions of arrows 405, 410 respectively (see FIG. 4, noting FIG. 4 illustrates a top view of the receiver unit 104 and transmitter unit 105). As previously described, rotation of the transmit elements 130A-130n, relative to the receive elements 120A-120n, will effect a downlink communication signal 155 in a substantially similar (e.g. where the transmit elements 130A-130n are rotated relative to the receive elements 120A-120n by about 180 degrees) or a different direction (e.g. where the transmit elements 130A-130n are rotated relative to the receive elements 120A-120n by an angle other than about 180 degrees such as about 0 degrees to about 179 degrees and about 181 degrees to about 360 degrees) from which the uplink communication signal 150 was received. FIG. 8 depicts a downlink communication signal 155 that is transmitted in a direction different than the direction of the uplink communication signal 150 was received.

Referring now to FIG. 9, in one aspect of the present disclosure, the communication platform 100, such as satellite 100A, is substantially free from beamforming hardware. This enables the satellite 100A to receive any predetermined number of uplink communication signals 150 and also transmit any predetermined number of downlink communication signals 155. In one aspect, the frequency reuse is set by the ground station which is flexible and dynamic via a ground network reconfiguration.

Referring now to FIG. 10, an exemplary flow diagram of an operation of the communication platform 100 is shown. At block 1001, an uplink communication signal 150 is received at a receiver unit 104 of communication platform 100. For example, in one aspect, the receive element 120A-120n receive the uplink communication signal 150 at a receive antenna 109. In one aspect of the present disclosure, the receive element 120A-120n also receive the beam frequency and beam amplification. At block 1002, the uplink communication signal 150 is transmitted to the amplifier unit 106 where it is amplified and converted to a downlink communication signal 155. The downlink communication signal 155 is produced when the beam frequency is converted from one frequency to another. At block 1003, the downlink communication signal 155 is transferred from the amplifier unit 106 to the transmitter unit 105. The transmitter unit 105 then, depending on the position relative to the receiver unit 120A-120n, transmits the downlink communication signal in a predetermined direction that is insensitive to vehicle 101 attitude.

Examples of the disclosure may be described in the context of a spacecraft manufacturing and service method 1100 as shown in FIG. 11 and a spacecraft 1200, such as satellite 100A, as shown in FIG. 12. During pre-production, illustrative method 1100 may include specification and design 1102 of the spacecraft 1200 and material procurement 1104. During production, component and subassembly manufacturing 1106 and system integration 1108 of the spacecraft 1200 take place. Thereafter, the spacecraft 1200 may go through certification and delivery 1110 to be placed in service 1112. While in service by a customer, the spacecraft 1200 is scheduled for routine maintenance and service 1114 (which may also include modification, reconfiguration, refurbishment, and so on).

Each of the processes of the illustrative method 1100 may be performed or carried out by a system integrator, a third party, and/or an operator (e.g., a customer). For the purposes of this description, a system integrator may include, without limitation, any number of spacecraft manufacturers and major-system subcontractors; a third party may include, without limitation, any number of vendors, subcontractors, and suppliers; and an operator may be an airline, leasing company, military entity, service organization, and so on.

As shown in FIG. 12, the spacecraft 1200 produced by the illustrative method 1100 may include an airframe 1202 with a plurality of high-level systems and an interior 1212. Examples of high-level systems, which are distributed throughout the spacecraft, include one or more of a propulsion system 1206, an electrical power system 1208, a hydraulic system 1210, and an environmental system 1204 and the satellite communications relay system 1214. Any number of other systems may be included.

The system and methods shown or described herein may be employed during any one or more of the stages of the manufacturing and service method 1100. For example, components or subassemblies corresponding to component and subassembly manufacturing 1106 may be fabricated or manufactured in a manner similar to components or subassemblies produced while the spacecraft 1200 is in service. Also, one or more aspects of the system, method, or combination thereof may be utilized during the production states 1106 and 1108, for example, by substantially expediting assembly of or reducing the cost of a spacecraft 1200. Similarly, one or more aspects of the system or method realizations, or a combination thereof, may be utilized, for example and without limitation, while the spacecraft 1200 is in service, e.g., operation, maintenance and service 1114.

Different examples and aspects of the system and methods are disclosed herein that include a variety of components, features, and functionality. It should be understood that the various examples and aspects of the system and methods disclosed herein may include any of the components, features, and functionality of any of the other examples and aspects of the system and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

In accordance with one or more aspects of the present disclosure, a spacecraft comprises a satellite receiver having receive elements, the satellite receiver being configured to receive at least one uplink communication signal including a beam amplitude and a beam frequency, a satellite amplifier configured to change the beam frequency and to amplify the beam amplitude, and a satellite transmitter having transmit elements, the satellite transmitter being configured to transmit at least one downlink communication signal wherein a direction of the at least one uplink communication signal and a direction of the at least one downlink communication signal are independent of an attitude of the spacecraft.

In accordance with one or more aspects of the present disclosure the at least one uplink communication signal comprises a user beam or a gateway beam.

In accordance with one or more aspects of the present disclosure the at least one downlink communication signal comprises a user beam or a gateway beam.

In accordance with one or more aspects of the present disclosure the transmit elements are rotated relative to the receive elements by about 180 degrees.

In accordance with one or more aspects of the present disclosure the transmit elements are configured to rotate relative to the receive elements by a predetermined amount.

In accordance with one or more aspects of the present disclosure the predetermined amount is such that the at least one downlink communication signal transmits in a common direction as the at least one uplink communication signal.

In accordance with one or more aspects of the present disclosure the predetermined amount is such that the at least one downlink communication signal transmits in a direction different from a direction of the at least one uplink communication signal.

In accordance with one or more aspects of the present disclosure the transmit elements are configured to tilt relative to the receive elements by a predetermined amount.

In accordance with one or more aspects of the present disclosure the tilt between the receive elements and the transmit elements effects focusing a downlink beam coverage area to an area smaller than an uplink beam coverage area.

In accordance with one or more aspects of the present disclosure the tilt between the receive elements and the transmit elements effects focusing an uplink beam coverage area to an area smaller than a downlink beam coverage area.

In accordance with one or more aspects of the present disclosure the receive elements and transmit elements each comprise a 1 by n linear array.

In accordance with one or more aspects of the present disclosure a distance between each receive element is a multiple of the beam frequency of the at least one uplink communication signal.

In accordance with one or more aspects of the present disclosure a distance between each transmit element is a multiple of a beam frequency of the at least one downlink communication signal.

In accordance with one or more aspects of the present disclosure the receive elements and transmit elements each comprise an n by m planar array.

In accordance with one or more aspects of the present disclosure a distance in the n direction between each receive element is a multiple of the beam frequency of the at least one uplink communication signal.

In accordance with one or more aspects of the present disclosure a distance in the m direction between each receive element is a multiple of the beam frequency of the at least one uplink communication signal.

In accordance with one or more aspects of the present disclosure a distance in the n direction between each transmit element is a multiple of a beam frequency of the at least one downlink communication signal.

In accordance with one or more aspects of the present disclosure a distance in the m direction between each transmit element is a multiple of a beam frequency of the at least one downlink communication signal.

In accordance with one or more aspects of the present disclosure the receive elements and transmit elements are located on a curved surface.

In accordance with one or more aspects of the present disclosure, the spacecraft further comprises a controller, wherein the controller is configured to selectively activate and deactivate the receive elements to effect broadening or narrowing an uplink beam coverage area of the at least one uplink communication signal.

In accordance with one or more aspects of the present disclosure, the spacecraft further comprises a controller, wherein the controller is configured to selectively activate and deactivate the transmit elements to effect broadening or narrowing a downlink beam coverage area of the at least one downlink communication signal.

In accordance with one or more aspects of the present disclosure each receive element is selectively mapped to a respective transmit element.

In accordance with one or more aspects of the present disclosure, the spacecraft further comprises a time shifter or a phase shifter configured to effect a dynamic change of the mapping between the receive elements and the transmit elements.

In accordance with one or more aspects of the present disclosure, the spacecraft further comprises a controller, wherein the controller is configured to dynamically change the mapping between the receive elements and the transmit elements.

In accordance with one or more aspects of the present disclosure the spacecraft is a satellite or an aerospace vehicle In accordance with one or more aspects of the present disclosure a spacecraft comprises a satellite frame and a retro-directive radio repeater connected to the satellite frame, the retro-directive radio repeater including a satellite receiver having receive elements, the satellite receiver configured to receive at least one uplink communication signal including a beam amplitude and a beam frequency, a satellite amplifier configured to change the beam frequency and to amplify the beam amplitude, and a satellite transmitter having transmit elements, the satellite transmitter configured to transmit at least one downlink communication signal wherein a direction of the at least one uplink communication signal and a direction of the at least one downlink communication signal are independent of an attitude of the spacecraft.

In accordance with one or more aspects of the present disclosure the at least one uplink communication signal comprises a user beam or a gateway beam.

In accordance with one or more aspects of the present disclosure the at least one downlink communication signal comprises a user beam or a gateway beam.

In accordance with one or more aspects of the present disclosure the transmit elements are rotated relative to the receive elements by about 180 degrees.

In accordance with one or more aspects of the present disclosure the transmit elements are configured to rotate relative to the receive elements by a predetermined amount.

In accordance with one or more aspects of the present disclosure the predetermined amount is such that the at least one downlink communication signal transmits in a common direction as the at least one uplink communication signal.

In accordance with one or more aspects of the present disclosure the predetermined amount is such that the at least one downlink communication signal transmits in a direction different from a direction of the at least one uplink communication signal.

In accordance with one or more aspects of the present disclosure the transmit elements are configured to tilt relative to the receive elements by a predetermined amount.

In accordance with one or more aspects of the present disclosure the tilt between the receive elements and the transmit elements effects focusing a downlink beam coverage area to an area smaller than an uplink beam coverage area.

In accordance with one or more aspects of the present disclosure the tilt between the receive elements and the transmit elements effects focusing an uplink beam coverage area to an area smaller than a downlink beam coverage area.

In accordance with one or more aspects of the present disclosure the receive elements and transmit elements each comprise a 1 by n linear array.

In accordance with one or more aspects of the present disclosure a distance between each receive element is a multiple of the beam frequency of the at least one uplink communication signal.

In accordance with one or more aspects of the present disclosure a distance between each transmit element is a multiple of a beam frequency of the at least one downlink communication signal.

In accordance with one or more aspects of the present disclosure the receive elements and transmit elements each comprise an n by m planar array.

In accordance with one or more aspects of the present disclosure a distance in the n direction between each receive element is a multiple of the beam frequency of the at least one uplink communication signal.

In accordance with one or more aspects of the present disclosure a distance in the m direction between each receive element is a multiple of the beam frequency of the at least one uplink communication signal.

In accordance with one or more aspects of the present disclosure a distance in the n direction between each transmit element is a multiple of a beam frequency of the at least one downlink communication signal.

In accordance with one or more aspects of the present disclosure a distance in the m direction between each transmit element is a multiple of a beam frequency of the at least one downlink communication signal.

In accordance with one or more aspects of the present disclosure the receive elements and transmit elements are located on a curved surface.

In accordance with one or more aspects of the present disclosure, the spacecraft further comprises a controller, wherein the controller is configured to selectively activate and deactivate the receive elements to effect broadening or narrowing an uplink beam coverage area of the at least one uplink communication signal.

In accordance with one or more aspects of the present disclosure, the spacecraft further comprises a controller, wherein the controller is configured to selectively activate and deactivate the transmit elements to effect broadening or narrowing a downlink beam coverage area of the at least one downlink communication signal.

In accordance with one or more aspects of the present disclosure each receive element is selectively mapped to a respective transmit element.

In accordance with one or more aspects of the present disclosure, the spacecraft further comprises a time shifter or a phase shifter configured to effect a dynamic change of the mapping between the receive elements and the transmit elements.

In accordance with one or more aspects of the present disclosure, the spacecraft further comprises a controller, wherein the controller is configured to dynamically change the mapping between the receive elements and the transmit elements.

In accordance with one or more aspects of the present disclosure a method of communication comprises receiving at least one uplink communication signal including a beam frequency and beam amplitude at a satellite receiver having receive elements, amplifying the at least one uplink communication signal with a satellite amplifier to change the beam frequency and beam amplitude to create at least one downlink communication signal, and transmitting the at least one downlink communication signal from a satellite transmitter having transmit elements wherein a direction of the at least one uplink communication signal and a direction of the at least one downlink communication signal are independent of a spacecraft attitude, where the satellite receiver and the satellite transmitter are mounted to the spacecraft.

In accordance with one or more aspects of the present disclosure, the method further comprises controlling a coverage area of the at least one downlink communication signal by tilting the transmit elements relative to the receive elements by a predetermined amount.

In accordance with one or more aspects of the present disclosure, the method further comprises controlling a coverage area of the at least one uplink communication signal by tilting the receive elements relative to the transmit elements by a predetermined amount.

In accordance with one or more aspects of the present disclosure, the method further comprises controlling a transmit direction of the at least one downlink communication signal relative to a receive direction of the at least one uplink communication signal by rotating the transmit elements relative to the receive elements by a predetermined amount.

In accordance with one or more aspects of the present disclosure, the method further comprises broadening or narrowing an uplink beam coverage area of the at least one uplink communication signal by selectively activating and deactivating the receive elements.

In accordance with one or more aspects of the present disclosure, the method further comprises broadening or narrowing a downlink beam coverage area of the at least one downlink communication signal by selectively activating and deactivating the transmit elements.

In accordance with one or more aspects of the present disclosure, the method further comprises dynamically changing a mapping between the receive elements and the transmit elements.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A spacecraft comprising:
   a satellite receiver having receive elements, the satellite receiver being configured to receive at least one uplink communication signal including a beam amplitude and a beam frequency;
   a satellite amplifier configured to change the beam frequency and to amplify the beam amplitude; and
   a satellite transmitter having transmit elements, the satellite transmitter being configured to transmit at least one downlink communication signal;
   wherein a direction of the at least one uplink communication signal and a direction of the at least one downlink communication signal are independent of an attitude orientation of the spacecraft relative to Earth.

2. The spacecraft of claim 1, wherein the at least one uplink communication signal comprises a user beam or a gateway beam.

3. The spacecraft of claim 1, wherein the at least one downlink communication signal comprises a user beam or a gateway beam.

4. The spacecraft of claim 1, wherein the transmit elements are distinct from the receive elements where the transmit elements and the receive elements are both configured to rotate relative to each other by a predetermined amount.

5. The spacecraft of claim 1, wherein the transmit elements are distinct from the receive elements where the transmit elements and the receive elements are both configured to tilt relative to each other by a predetermined amount.

6. The spacecraft of claim 1, wherein the receive elements and transmit elements each comprise a 1 by n linear array.

7. The spacecraft of claim 1, wherein the receive elements and transmit elements each comprise an n by m planar array.

8. The spacecraft of claim 1, wherein the receive elements and transmit elements are located on a contoured surface.

9. The spacecraft of claim 1, further comprising a controller, wherein the controller is configured to selectively activate and deactivate the receive elements to effect broadening or narrowing an uplink beam coverage area of the at least one uplink communication signal.

10. The spacecraft of claim 1, further comprising a controller, wherein the controller is configured to selectively activate and deactivate the transmit elements to effect broadening or narrowing a downlink beam coverage area of the at least one downlink communication signal.

11. The spacecraft of claim 1, wherein each receive element is selectively mapped to a respective transmit element.

12. The spacecraft of claim 1, wherein the spacecraft is a satellite or an aerospace vehicle.

13. A spacecraft comprising:
a satellite frame; and
a retro-directive radio repeater connected to the satellite frame, the retro-directive radio repeater including:
a satellite receiver having receive elements, the satellite receiver configured to receive at least one uplink communication signal including a beam amplitude and a beam frequency;
a satellite amplifier configured to change the beam frequency and to amplify the beam amplitude; and
a satellite transmitter having transmit elements, the satellite transmitter configured to transmit at least one downlink communication signal;
wherein a direction of the at least one uplink communication signal and a direction of the at least one downlink communication signal are independent of an attitude orientation of the satellite frame relative to Earth.

14. The spacecraft of claim 13, wherein the transmit elements are distinct from the receive elements where the transmit elements and the receive elements are both configured to rotate relative to each other by a predetermined amount.

15. The spacecraft of claim 13, wherein the transmit elements are distinct from the receive elements where the transmit elements and the receive elements are both configured to tilt relative to each other by a predetermined amount.

16. A method of communication comprising:
receiving at least one uplink communication signal including a beam frequency and beam amplitude at a satellite receiver having receive elements;
amplifying the at least one uplink communication signal with a satellite amplifier to change the beam frequency and beam amplitude to create at least one downlink communication signal; and
transmitting the at least one downlink communication signal from a satellite transmitter having transmit elements;
wherein a direction of the at least one uplink communication signal and a direction of the at least one downlink communication signal are independent of a spacecraft attitude orientation relative to Earth, where the satellite receiver and the satellite transmitter are mounted to the spacecraft.

17. The method of claim 16, further comprising one or more of controlling a coverage area of the at least one downlink communication signal by tilting the transmit elements relative to the receive elements by a predetermined amount, and controlling a coverage area of the at least one uplink communication signal by tilting the receive elements relative to the transmit elements by a predetermined amount.

18. The method of claim 16, further comprising controlling a transmit direction of the at least one downlink communication signal relative to a receive direction of the at least one uplink communication signal by rotating the transmit elements relative to the receive elements by a predetermined amount where the transmit elements are distinct from the receive elements and the transmit elements and the receive elements are both configured to rotate relative to each other.

19. The method of claim 16, further comprising: one or more of broadening or narrowing an uplink beam coverage area of the at least one uplink communication signal by selectively activating and deactivating the receive elements, and broadening or narrowing a downlink beam coverage area of the at least one downlink communication signal by selectively activating and deactivating the transmit elements.

20. The method of claim 16, further comprising dynamically changing a mapping between the receive elements and the transmit elements.

* * * * *